(12) United States Patent
Yi

(10) Patent No.: US 6,286,642 B1
(45) Date of Patent: Sep. 11, 2001

(54) FLUID REGULATING DEVICE FOR USE WITH A SHOCK-ABSORBING CYLINDER TO OBTAIN A VARIABLE SHOCK ABSORBING EFFECT

(75) Inventor: Chen-Hsing Yi, Taichung Hsien (TW)

(73) Assignee: Giant Mfg. Co., LTD, Taichung Hsien (TW)

( * ) Notice: Subject to any disclaimer, the term of this patent is extended or adjusted under 35 U.S.C. 154(b) by 0 days.

(21) Appl. No.: 09/420,053

(22) Filed: Oct. 18, 1999

(51) Int. Cl.[7] .................................................. F16F 9/34
(52) U.S. Cl. .................. 188/319.2; 188/269; 188/282.4; 188/304; 188/313; 188/315; 188/299.1; 280/284
(58) Field of Search ................................ 188/319.2, 269, 188/282.4, 304, 313, 315, 299.1; 280/284, 275, 285

(56) References Cited

U.S. PATENT DOCUMENTS

| | | | |
|---|---|---|---|
| 4,756,393 | * | 7/1988 | Collee et al. .......................... 188/299 |
| 4,926,983 | * | 5/1990 | Taubitz .................................. 188/299 |
| 5,186,481 | * | 2/1993 | Turner .................................... 280/276 |
| 5,211,268 | * | 5/1993 | Lizell et al. ........................... 188/281 |
| 5,275,264 | * | 1/1994 | Isella ..................................... 188/299 |
| 5,301,776 | * | 4/1994 | Beck ..................................... 188/299 |
| 5,308,099 | * | 5/1994 | Browning .............................. 280/276 |
| 5,369,345 | * | 11/1994 | Lizell et al. ........................... 188/281 |
| 5,456,480 | * | 10/1995 | Turner et al. ......................... 280/276 |
| 5,522,483 | * | 6/1996 | Koch ..................................... 188/299 |
| 5,542,509 | * | 8/1996 | Bell ................................... 188/322.14 |
| 5,634,653 | * | 6/1997 | Browning .............................. 280/276 |
| 5,682,966 | * | 11/1997 | Cabrerizo-Pariente ............... 188/269 |
| 5,775,677 | * | 7/1998 | Englund ............................. 267/64.11 |
| 5,810,128 | * | 9/1998 | Eriksson et al. ...................... 188/289 |
| 5,848,675 | * | 12/1998 | Gonzalez ............................ 188/319.2 |
| 5,971,116 | * | 10/1999 | Franklin ............................. 188/282.4 |
| 6,120,049 | * | 9/2000 | Gonzalez et al. .................... 280/276 |
| 6,149,174 | * | 11/2000 | Bohn .................................... 280/283 |

* cited by examiner

*Primary Examiner*—Robert L. Oberleitner
*Assistant Examiner*—Benjamin A Pezzlo
(74) *Attorney, Agent, or Firm*—Christie, Parke & Hale, LLP

(57) ABSTRACT

A fluid regulating device includes a valve housing formed with a piston receiving chamber that has a piston member slidingly and sealingly disposed therein to divide the piston receiving chamber into a volume-variable gas compartment filled with pressurized gas and a volume-variable fluid compartment. A regulator receiving chamber has a large-diameter rod receiving section, and a small-diameter fluid channel with a rate control section that is aligned with and that extends from the rod receiving section. The fluid channel interconnects fluidly the rod receiving section and the fluid compartment. A fluid regulating rod is disposed inside the regulator receiving chamber, and includes a slide portion slidingly and sealingly disposed in the rod receiving section, and a passage-forming portion that has a cross-section smaller than that of the slide portion to define a fluid passage inside the regulator receiving chamber for communicating fluidly the rate control section and a fluid opening that is in fluid communication with the rod receiving section. A fluid-controlling portion extends from the passage-forming portion and is extendible into the rate control section. An actuated portion extends from the slide portion and outwardly of the regulator receiving chamber.

7 Claims, 9 Drawing Sheets

US 6,286,642 B1

FLUID REGULATING DEVICE FOR USE WITH A SHOCK-ABSORBING CYLINDER TO OBTAIN A VARIABLE SHOCK ABSORBING EFFECT

FIELD OF THE INVENTION

The invention relates to a fluid regulating device, more particularly to a fluid regulating device for use with a shock-absorbing cylinder to obtain a variable shock absorbing effect.

BACKGROUND OF THE INVENTION

A cylinder device is generally installed in a bicycle to serve as a shock absorbing apparatus to absorb shock which results when the bicycle travels along an uneven road surface. Although there are different types of shock absorbing apparatus, such as a spring-type or hydraulic-type or a combination of both types, presently available in the market, they are not adjustable in order to provide a variable shock absorbing effect so as to conform with the road conditions.

SUMMARY OF THE INVENTION

The main object of this invention is to provide a fluid regulating device for use with a shock-absorbing cylinder to obtain a variable shock absorbing effect.

Accordingly, the fluid regulating device of the present invention is used together with a shock-absorbing cylinder to obtain a variable shock absorbing effect. The shock-absorbing device includes a cylinder body and a piston. The cylinder body has a first end portion formed with a fluid port, and a second end portion. The piston is slidingly and sealingly disposed in the second end portion of the cylinder body, and is movable in a first direction toward the first end portion to cause fluid in the cylinder body to flow out of the fluid port, and in a second direction away from the first end portion in response to return flow of the fluid into the fluid port. The shock-absorbing cylinder further includes a piston rod that has a connecting end connected to the piston, and a coupling end extending out of the second end portion of the cylinder body. The fluid regulating device includes a valve housing, a fluid regulating rod, and a control device. The valve housing is formed with a piston receiving chamber and a regulator receiving chamber. The piston receiving chamber has a piston member slidingly and sealingly disposed therein. The piston member divides the piston receiving chamber into a volume-variable gas compartment and a volume-variable fluid compartment on opposite sides of the piston member. The gas compartment stores pressurized gas therein. The regulator receiving chamber has a large-diameter rod receiving section that extends in a longitudinal direction, and a small-diameter fluid channel with a rate control section that is aligned with and that extends from the rod receiving section. The fluid channel interconnects fluidly the rod receiving section and the fluid compartment. A fluid opening is disposed adjacent to the rate control section of the fluid channel. The fluid opening is in fluid communication with the rod receiving section and is adapted to be connected fluidly to the fluid port. The fluid regulating rod is disposed inside the regulator receiving chamber, and includes a slide portion slidingly and sealingly disposed in the rod receiving section, and a passage-forming portion that extends from the slide portion and that has a cross-section smaller than that of the slide portion. The passage-forming portion is disposed adjacent to the fluid opening and defines a fluid passage inside the regulator receiving chamber to communicate fluidly the rate control section of the fluid channel and the fluid opening. A fluid-controlling portion extends from the passage-forming portion and is extendible into the rate control section of the fluid channel to control rate of fluid flow through the fluid channel. An actuated portion extends from the slide portion and outwardly of the regulator receiving chamber. The control device includes a driving motor with an output shaft, and a cam member mounted on the output shaft. The cam member has a cam surface that abuts against the actuated portion of the fluid regulating rod. The cam member is rotated by the driving motor to cause the cam surface thereof to push the fluid regulating rod and move the slide portion of the fluid regulating rod inside the rod receiving section so as to vary degree of extension of the fluid-controlling portion of the fluid regulating rod into the rate control section of the fluid channel in order to control the rate of the fluid flow through the fluid channel for achieving the variable shock absorbing effect.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
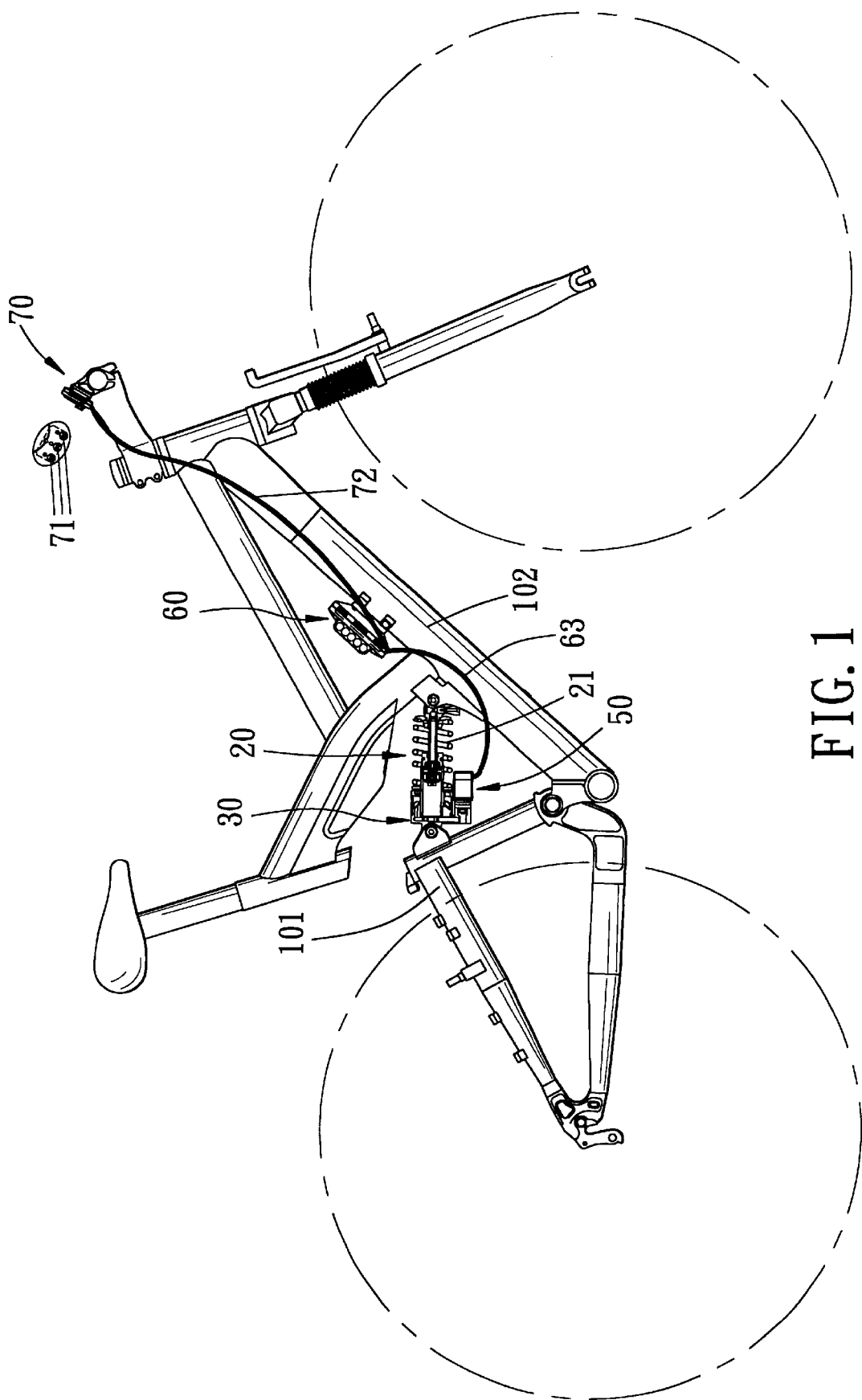
FIG. 1 shows a bicycle in which the first preferred embodiment of a fluid regulating device of the present invention is mounted for use with a shock-absorbing cylinder to serve as a shock absorbing apparatus.
Figure 2:
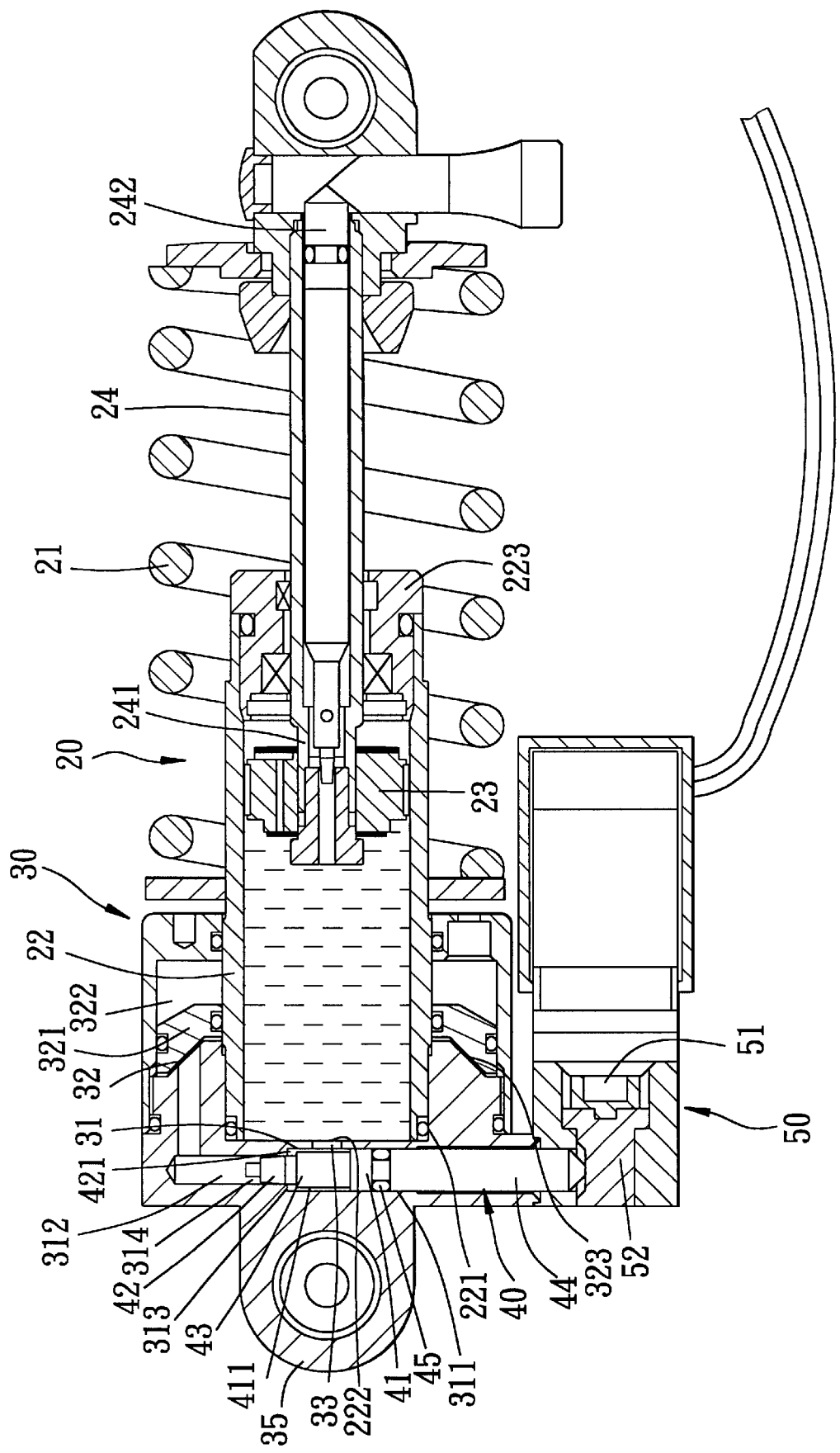
FIG. 2 is a sectional view of the first preferred embodiment.
Figure 3:
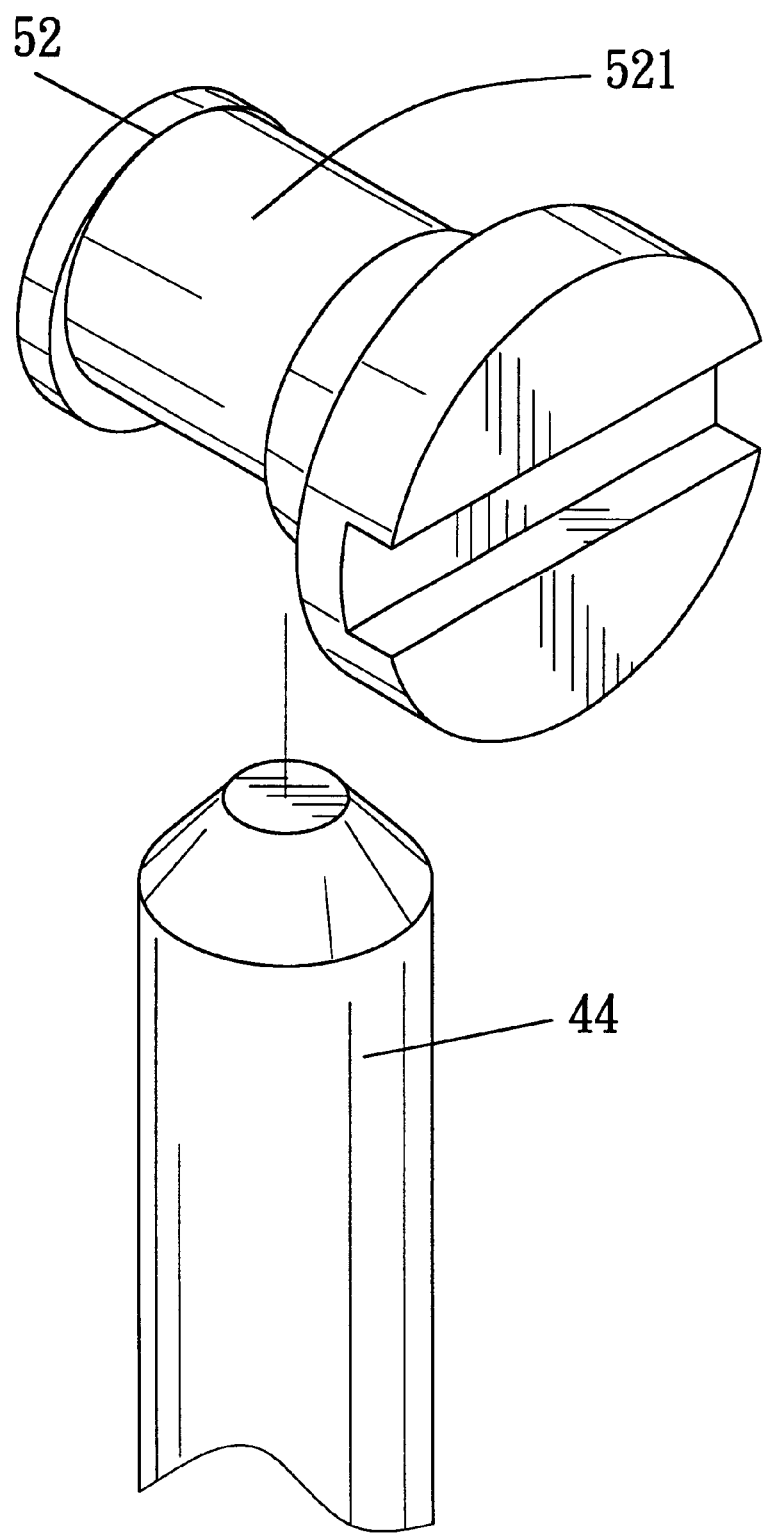
FIG. 3 shows a cam member employed in the first preferred embodiment.

Referring to FIGS. 1, 2, and 3, the first preferred embodiment of a fluid regulating device of the present invention is adapted for use with a shock-absorbing cylinder 20 to form a shock absorbing apparatus with a variable shock absorbing effect. The fluid regulating device includes a valve housing 30, a fluid regulating rod 40, and a control device.

As illustrated, the cylinder 20 is a hydraulic cylinder that includes a cylinder body 22 filled with hydraulic fluid. The cylinder body 22 includes a first end portion 221 formed with a fluid port 222, and a second end portion 223 that has a piston 23 slidingly and sealingly disposed therein. The piston 23 is movable against biasing action of a coil spring 21 in a first direction toward the first end portion 221 to cause the hydraulic fluid to flow out of the fluid port 222, and in a second direction away from the first end portion 221 due to restoration force of the coil spring 21 and in response to return flow of the hydraulic fluid into the fluid port 222. The cylinder 20 further includes a piston rod 24 that has a connecting end 241 connected to the piston 23, and a coupling end 242 extending out of the second end portion 223 of the cylinder body 22.

The valve housing 30 is formed with a regulator receiving chamber 31 and a piston receiving chamber 32 that has a piston member 321 slidingly and sealingly disposed therein. The piston member 321 divides the piston receiving chamber 32 into a volume-variable gas compartment 322 and a volume-variable fluid compartment 323 on opposite sides of the piston member 321. The gas compartment 322 stores a pressurized gas therein.

The regulator receiving chamber 31 has a large-diameter rod receiving section 311 that extends in a longitudinal direction, and a small-diameter fluid channel 312 with a rate control section 314 that is aligned with and that extends from the rod receiving section 311. The fluid channel 312 interconnects fluidly the rod receiving section 311 and the fluid compartment 323.

The regulator receiving chamber 31 has a fluid opening 33 adjacent to and in fluid communication with the rod receiving section 311. The fluid opening 33 is adapted to be connected fluidly to the fluid port 222 of the cylinder body 22.

The fluid regulating rod 40 is disposed inside the regulator receiving chamber 31, and has a slide portion 41 slidingly and sealingly disposed in the rod receiving section 311, and a passage-forming portion 43 that extends from the slide portion 41 and that has a cross-section smaller than that of the slide portion 41. The passage-forming portion 43 is disposed adjacent to the fluid opening 33 and defines a fluid passage 411 inside the regulator receiving chamber 31 to communicate fluidly the rate control section 314 of the fluid channel 312 and the fluid opening 33. The fluid regulating rod 40 further has a fluid-controlling portion 42 that extends from the passage-forming portion 43 and that is extendible into the rate control section 314 of the fluid channel 312 to control rate of fluid flow through the fluid channel 312, and an actuated portion 44 that extends from the slide portion 41 and that extends outwardly of the regulator receiving chamber 31. In order to prevent fluid leakage from the regulator receiving chamber 31 due to movement of the fluid regulator rod 40 therein, the slide portion 41 of the regulating rod 40 is formed with a circumferential groove to receive a seal ring 45 which contacts slidingly and sealingly an inner wall that confines the rod receiving section 311 of the regulator receiving chamber 31.

The control device is mounted on an outer surface of the valve housing 30, and includes a driving motor 50 with an output shaft 51, and a cam member 52 mounted on the output shaft 51. The cam member 52 has a cam surface 521 (see FIG. 3) that abuts against the actuated portion 44 of the fluid regulating rod 40. The cam member 52 is rotated by the driving motor 51 to cause the cam surface 521 thereof to push the fluid regulating rod 40 and move the slide portion 41 of the regulating rod 40 inside the rod receiving section 311 so as to vary degree of extension of the fluid-controlling portion 42 of the fluid regulating rod 40 into the rate control section 314 of the fluid channel 312 in order to control the rate of the fluid flow through the fluid channel 312 for achieving the variable shock absorbing effect.

The valve housing 30 is further formed with a housing shoulder 313 between the rod receiving section 311 and the rate control section 314 of the fluid channel 312. The fluid-controlling portion 42 of the fluid regulating rod 40 has a cross-section smaller than that of the passage-forming portion 43 to form an abutment shoulder 421 between the fluid-controlling portion 42 and the passage-forming portion 43. Thus, abutment of the abutment shoulder 421 with the housing shoulder 313 blocks entirely the fluid flow through the fluid channel 312.

The fluid-controlling portion 42 of the fluid regulating rod 40 tapers in a direction away from the passage-forming portion 43. The driving motor 50 is preferably a servo motor. The cam member 52 is a drive wheel mounted eccentrically on the output shaft 51 of the driving motor 50 such that different angular orientation of the drive wheel will provide different extension of the fluid-controlling portion 42 of the fluid regulating rod 40 into the rate control section 313 of the fluid channel 312.

In the first preferred embodiment, the valve housing 30 is formed as a cap member which is mounted on the first end portion 221 of the cylinder body 22 and which has a connecting portion 35 connected pivotally to the wheel-carrying rear frame 101 of a bicycle, as best shown in FIG. 1. The regulator receiving chamber 31 is formed in an end wall of the valve housing 30, whereas the piston receiving chamber 32 is formed as an annular chamber in an annular surrounding wall of the valve housing 30. The piston member 321 is formed as an annular member around the first end portion 221 of the cylinder body 22. The fluid port 222 is an open mouth of the first end portion 221. The coupling end 242 of the piston rod 24 is connected pivotally to the wheel-carrying front frame 102 of the bicycle. The control device further includes an operating panel 70 with three different switches 71, and a control circuit 60 connected electrically to the driving motor 50 and the operating panel 70 via two connecting wires 63, 72. Preferably, the control panel 70 is mounted on the handlebar of the bicycle. The operating panel 70 can be provided with a display member (not shown) to indicate the residual power of a battery unit (not shown). In this embodiment, the operating panel 70 is operable in the following manner so as to control operation of the driving motor 50.

Figure 4:
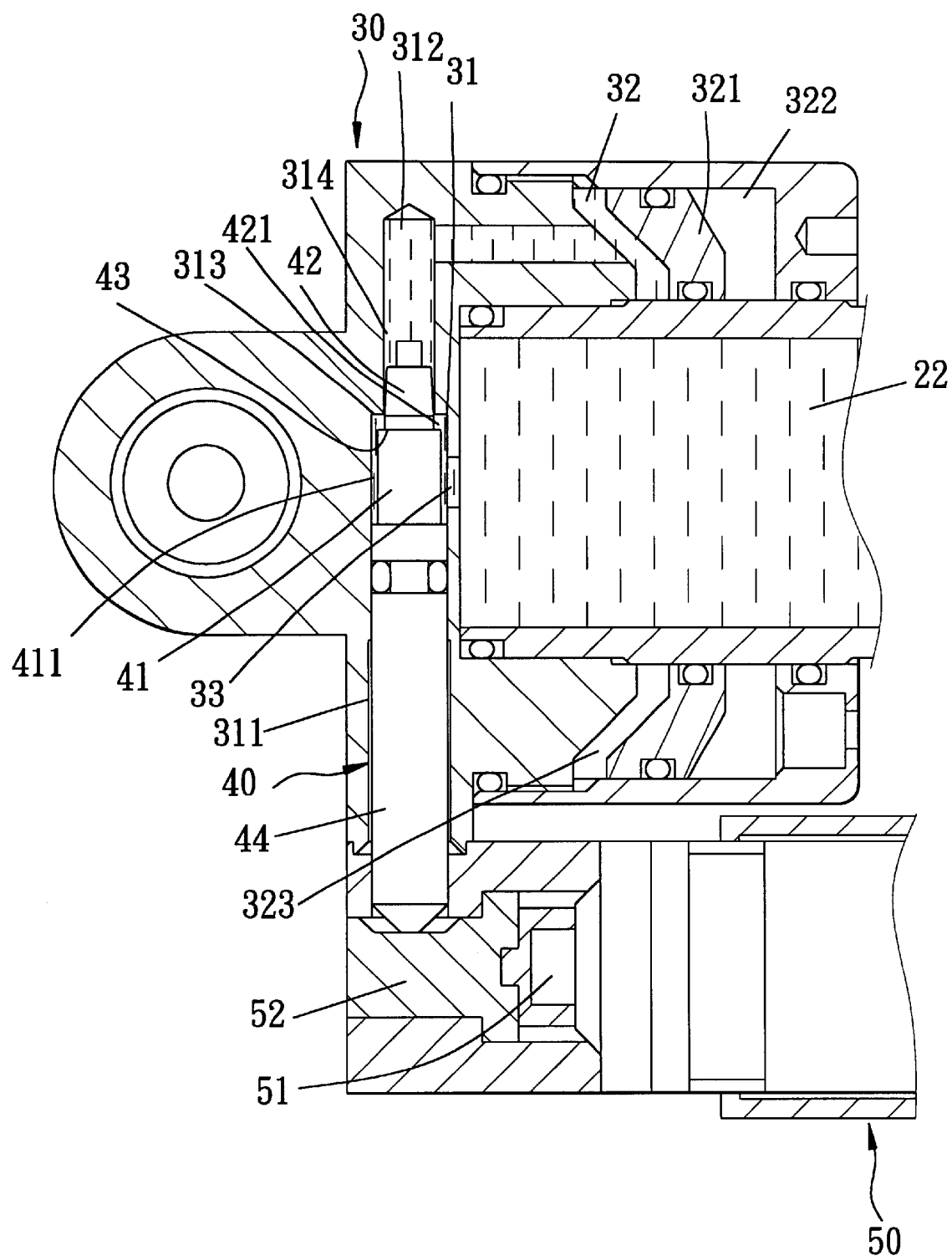
FIG. 4(A) is a sectional view of the first preferred embodiment shown together with a hydraulic cylinder, illustrating a first condition of use where the first preferred embodiment absorbs a relatively large amount of shock.
FIG. 4(B) is a sectional view of the first preferred embodiment shown together with a hydraulic cylinder, illustrating a second condition of use where the first preferred embodiment absorbs a smaller amount of shock.
FIG. 4(C) is a sectional view of the first preferred embodiment shown together with a hydraulic cylinder, illustrating a third condition of use where the first preferred embodiment absorbs a minimum amount of shock.
Figure 4:
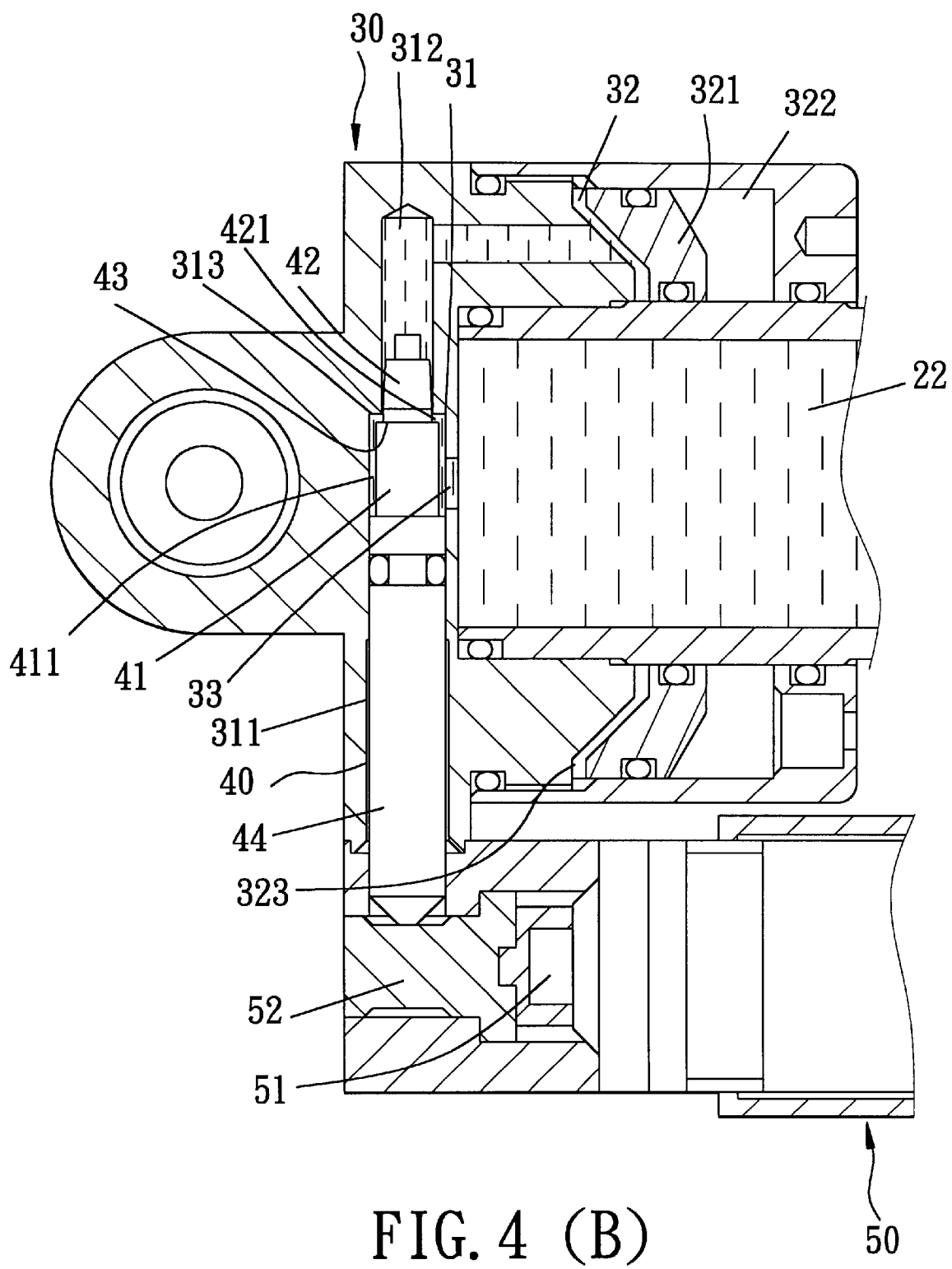
Figure 4:
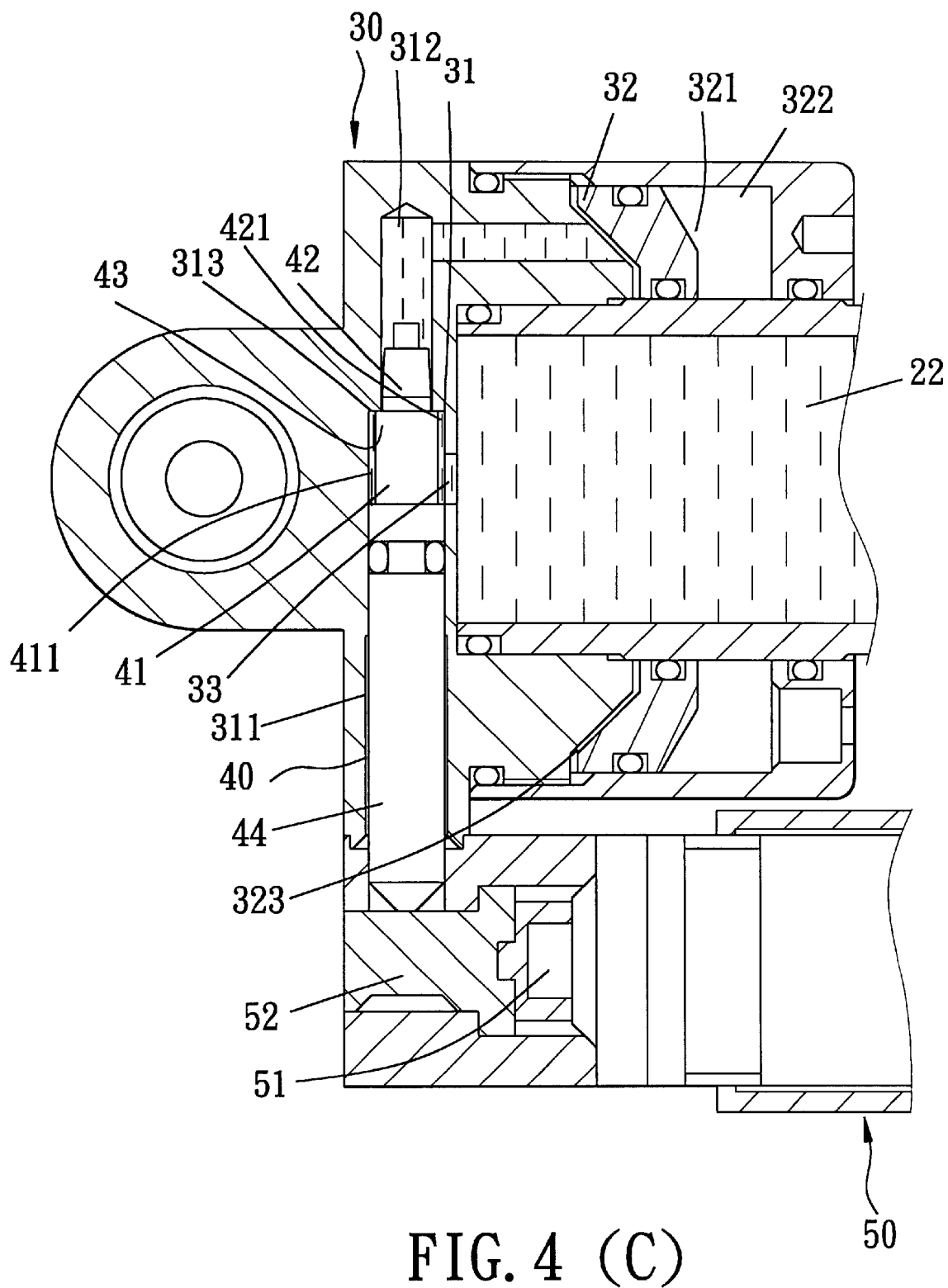

With reference to FIGS. 3 and 4(A), when the bicycle is travelling on an uneven road surface that is full of deep holes, the first switch 71 of the operating panel 70 can be manipulated so as to generate a first signal which is transmitted to the control circuit 60 such that the control circuit 60 will command the driving motor 50 and drive the cam member 52 to rotate so that a relatively large fluid passage 411 will be formed between the housing shoulder 313 and the abutment shoulder 421. Under this condition, a relatively large amount of fluid from the cylinder body 22 will flow into the fluid compartment 323 via the rate control section 314 so that the shock absorbing apparatus of the present invention will be able to absorb a relatively large amount of shock by virtue of the restoration force attributed to the pressurized gas in the volume-variable gas chamber 322.

Referring to FIG. 4(B), in case the bicycle is travelling on a relatively even road surface, the shock absorbing apparatus only needs to absorb a relatively small amount of shock. Under such a condition, the second switch 71 of the operating panel 70 can be manipulated to convey a second signal to the control circuit 60 for commanding the driving motor 50 to consequently drive the cam member 52 such that a smaller fluid passage 411 will be formed between the housing shoulder 313 and the abutment shoulder 421. Thus, a relatively small amount of fluid from the cylinder body 22 will be able to flow into the fluid compartment 323 via the rate control section 314 so that a relatively small amount of shock will be absorbed by virtue of the restoration force attributed to the pressurized gas in the volume-variable gas chamber 322.

Referring to FIG. 4(C), in the event that the bicycle is travelling on a very even road surface or climbing a sloped road surface, there is no shock experienced and thus, it is desired that the travelling speed of the bicycle will not be hampered by the shock absorbing action. At this time, the third switch 71 of the operating panel 70 can be manipulated to convey a third signal to the control circuit 60 for commanding the driving motor 51. The driving motor 51 correspondingly drives the cam member 52 such that the abutment shoulder 421 will abut against the housing shoulder 313 and interrupt fluid communication between the fluid compartment 323 and the cylinder body 22.

Figure 5:
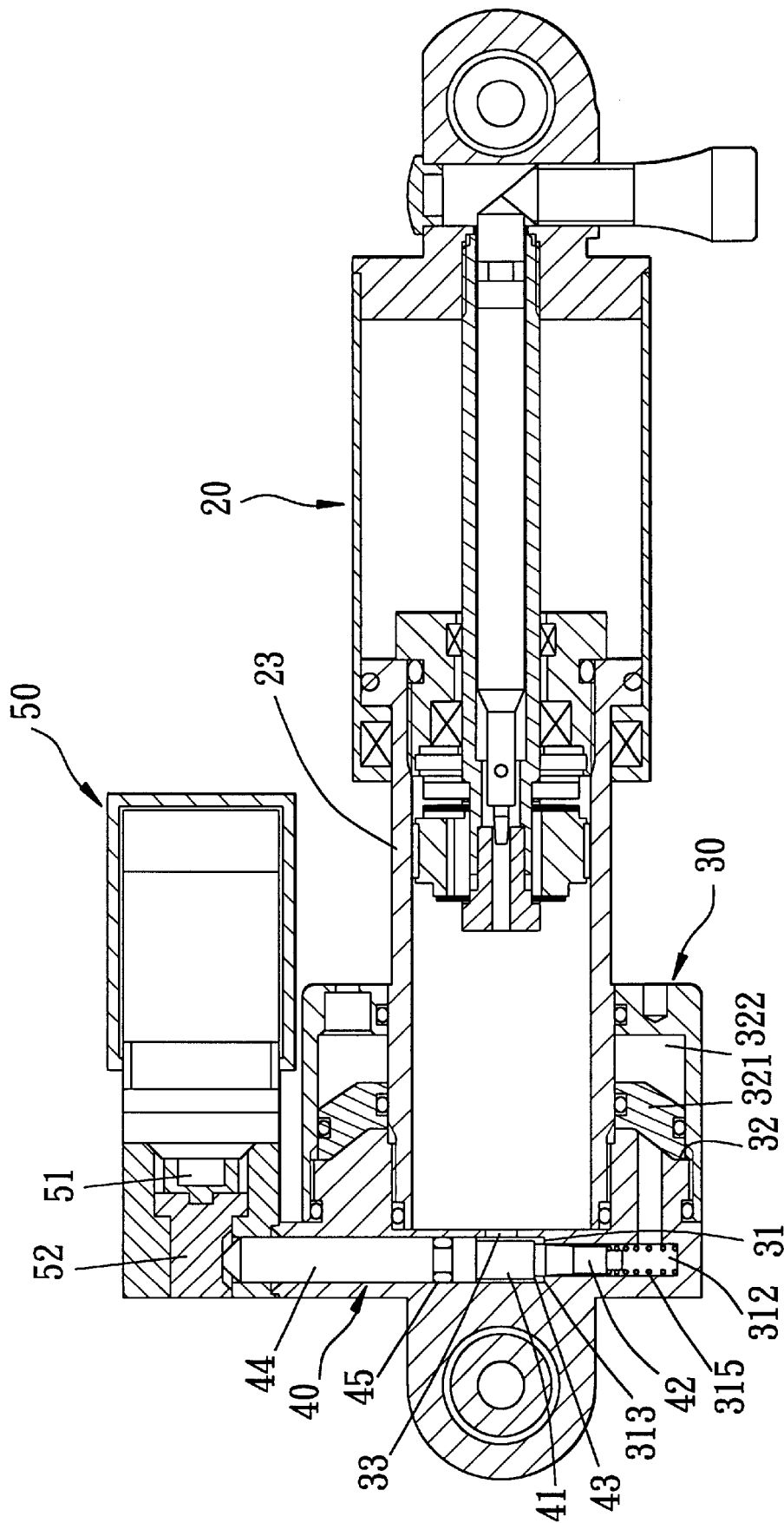
FIG. 5 is a sectional view of a second preferred embodiment of the present invention shown together with a pneumatic cylinder.

Referring to FIG. 5, a second preferred embodiment of the present invention is shown to be similar to the first preferred embodiment in structure except that the shock-absorbing cylinder 20 includes a pneumatic cylinder body 23, and a compression spring 315 is sleeved around the fluid-controlling portion 42 of the fluid regulating rod 40 in the fluid channel 312 to bias the fluid regulating rod 40 to an initial position.

Figure 6:
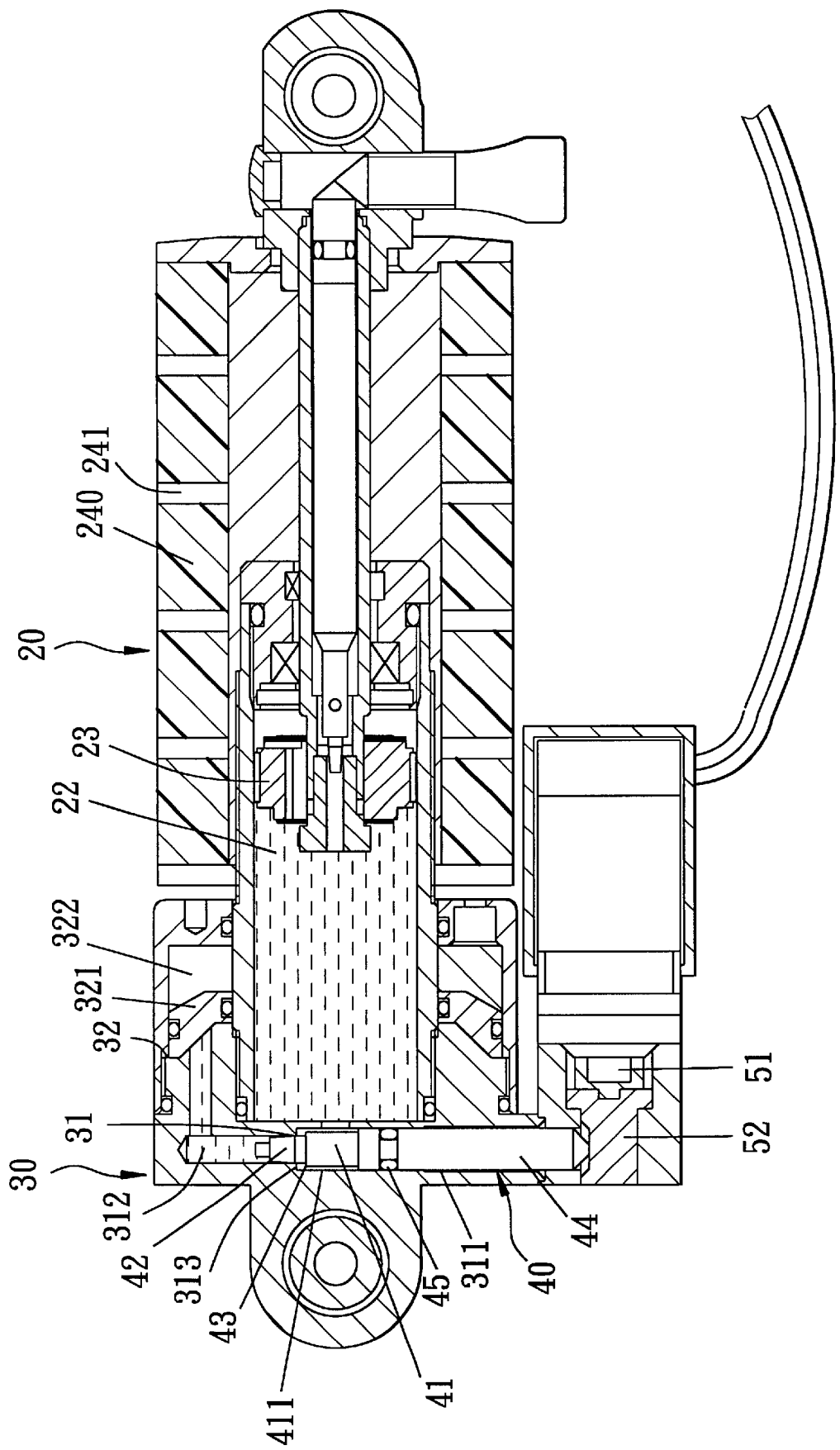
FIG. 6 is a sectional view of a third preferred embodiment of the present invention shown together with another hydraulic cylinder.

FIG. 6 shows a third preferred embodiment of the present invention to be similar to the first preferred embodiment in structure, except that the hydraulic cylinder 20 includes a compressive elastomeric body 240 disposed around the cylinder body 22. The elastomeric body 240 is formed with a plurality of circumferential grooves 241 which assist in swift restoration of the piston member 23 to its initial position.

Figure 7:
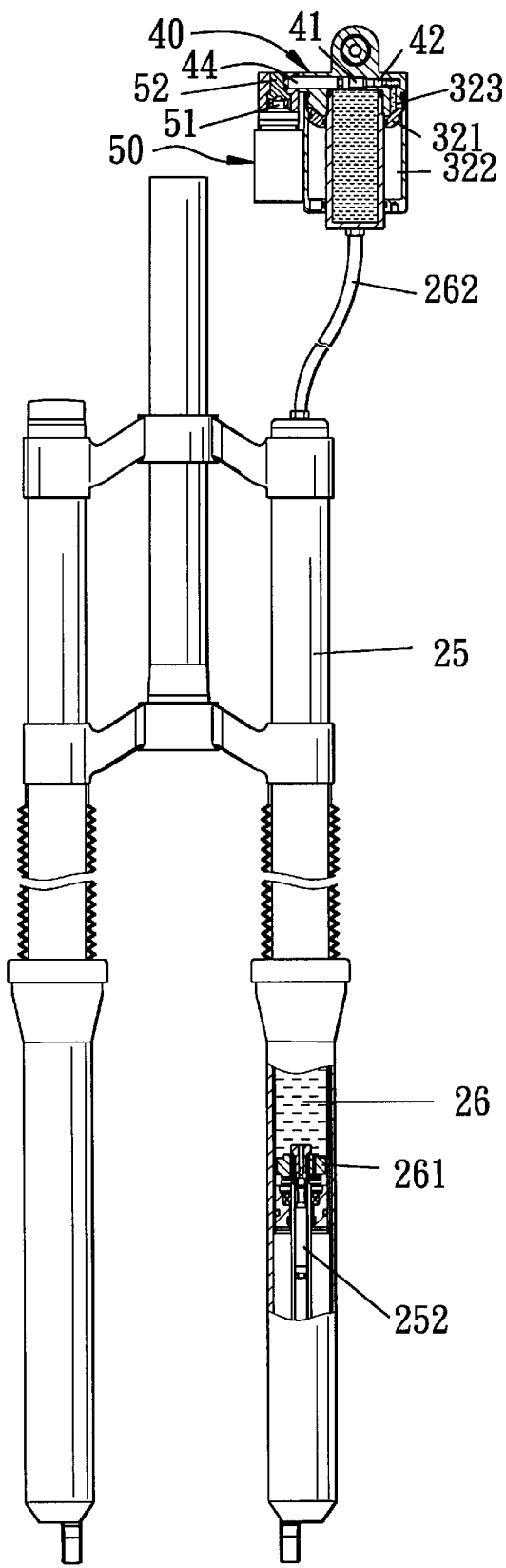
FIG. 7 is a sectional view of a fourth preferred embodiment of the present invention shown together with a hydraulic cylinder on a bicycle fork.

FIG. 7 illustrates how a fourth preferred embodiment of the present invention is used together with a bicycle fork assembly 25. As shown, one of the prongs 251 of the fork assembly 25 includes a hydraulic cylinder body 26 having a first end portion formed with a fluid port (not shown) for connection with the fluid compartment 323 of the valve housing 40 in the fourth preferred embodiment via a tube 262, and a second end portion in which a piston member 261 is sealingly and slidably disposed. A piston rod 252 has a connecting end connected to the piston member 261 and a coupling end extending outwardly of the cylinder body 26 for receiving an axle of a wheel (not shown). The features and objects are the same as those of the previous embodiments.

With this invention thus explained, it is apparent that numerous modifications and variations can be made without departing from the scope and spirit of this invention. It is, thus, intended that this invention be limited only as indicated in the appended claims.

I claim:

1. A shock-absorbing device comprising:
    a shock-absorbing cylinder including a cylinder unit having a first cylinder portion with opposite first and second ends, and a second cylinder portion in fluid communication with said second end of said first cylinder portion, said second cylinder portion having a piston slidingly and sealingly disposed therein, said shock-absorbing cylinder further including a piston rod having a connecting end connected to said piston and a coupling end extending out of said second cylinder portion; and
    a fluid regulating device including a valve housing capped on said first cylinder portion of said cylinder unit and formed with an end wall for closing said first end of said first cylinder portion, a surrounding wall that extends from said end wall and that surrounds said first cylinder portion, and an end flange that extends inwardly from said surrounding wall and that is in sealing contact with said first cylinder portion;
    said valve housing cooperating with said first cylinder portion to confine a piston receiving chamber around said first cylinder portion, said piston receiving chamber having a piston member slidingly and sealingly disposed therein to divide said piston receiving chamber into a volume-variable gas compartment and a volume-variable fluid compartment on opposite sides of said piston member, said gas compartment being disposed proximate to said end flange and storing pressurized gas therein, said fluid compartment being disposed proximate to said end wall;
    said end wall being formed with a regulator receiving chamber that extends in a longitudinal direction transverse to an axis of said first cylinder portion, said regulator receiving chamber having a large-diameter rod receiving section and a small-diameter fluid channel with a rate control section that is aligned with and that extends from said rod receiving section in the longitudinal direction toward said surrounding wall;
    said end wall being further formed with a first fluid opening that is in fluid communication with said rod receiving section adjacent to said rate control section of said fluid channel and with said first end of said first cylinder portion;
    said end wall being further formed with a second fluid opening that is in fluid communication with said fluid channel adjacent to said surrounding wall and with said fluid compartment;
    said fluid regulating device further including a fluid regulating rod disposed inside said regulator receiving chamber, said fluid regulating rod having
    a slide portion slidingly and sealingly disposed in said rod receiving section,
    a passage-forming portion extending from said slide portion in the longitudinal direction and having a cross-section smaller than that of said slide portion, said passage-forming portion being disposed adjacent to said first fluid opening and defining a fluid passage inside said regulator receiving chamber to communicate fluidly said rate control section of said fluid channel and said first fluid opening,
    a fluid-controlling portion extending from said passage-forming portion in the longitudinal direction and extendible into said rate control section of said fluid channel to control rate of fluid flow through said fluid channel, and
    an actuated portion extending from said slide portion in the longitudinal direction and outwardly of said regulator receiving chamber;
    an actuated portion extending from said slide portion in the longitudinal direction and outwardly of said regulator receiving chamber;
    said fluid regulating device further including a control device having a driving motor with an output shaft, and a cam member mounted on said output shaft and having a cam surface that abuts against said actuated portion of said regulating rod, said cam member being rotated by said driving motor to cause said cam surface thereof to push said fluid regulating rod and move said slide portion of said fluid regulating rod inside said rod receiving section so as to vary degree of extension of said fluid-controlling portion of said fluid regulating rod into said rate control section of said fluid channel in order to control the rate of the fluid flow through said fluid channel.

2. The shock-absorbing device as defined in claim 1, wherein said end wall is further formed with a housing shoulder between said rod receiving section and said fluid channel, said fluid-controlling portion of said fluid regulating rod having a cross-section smaller than that of said passage-forming portion to form an abutment shoulder between said fluid-controlling portion and said passage-forming portion, whereby abutment of said abutment shoulder against said housing shoulder blocks entirely the fluid flow through said fluid channel.

3. The shock-absorbing device as defined in claim 1, wherein said fluid-controlling portion of said fluid regulating rod tapers in a direction away from said passage-forming portion.

4. The shock-absorbing device as defined in claim 1, wherein said driving motor is a servo motor.

5. The shock-absorbing device as defined in claim 1, wherein said cam member is a drive wheel mounted eccentrically on said output shaft of said driving motor.

6. The shock-absorbing device as defined in claim 1, wherein said control device is mounted on said valve housing.

7. The shock-absorbing device as defined in claim 1, further comprising a control circuit connected electrically to said driving motor and operable so as to control operation of said driving motor.

* * * * *